(12) United States Patent
Tabet et al.

(10) Patent No.: US 9,084,269 B2
(45) Date of Patent: Jul. 14, 2015

(54) FOURIER TRANSFORM FOR A SIGNAL TO BE TRANSMITTED ON A RANDOM ACCESS CHANNEL

(75) Inventors: Tarik Tabet, Montreal (CA); Nallepilli Ramesh, New Providence, NJ (US); Godfrey Costa, Clifton (GB)

(73) Assignee: Nvidia Technology UK Limited, London (GB)

( * ) Notice: Subject to any disclaimer, the term of this patent is extended or adjusted under 35 U.S.C. 154(b) by 200 days.

(21) Appl. No.: 13/638,271

(22) PCT Filed: Mar. 30, 2011

(86) PCT No.: PCT/EP2011/054954
§ 371 (c)(1),
(2), (4) Date: Nov. 13, 2012

(87) PCT Pub. No.: WO2011/121044
PCT Pub. Date: Oct. 6, 2011

(65) Prior Publication Data
US 2013/0223360 A1    Aug. 29, 2013

(30) Foreign Application Priority Data
Mar. 30, 2010  (GB) .................................. 1005319.7

(51) Int. Cl.
*H04W 74/08* (2009.01)
*G06F 17/14* (2006.01)
*H04L 27/26* (2006.01)

(52) U.S. Cl.
CPC ......... *H04W 74/0833* (2013.01); *G06F 17/141* (2013.01); *H04L 27/2636* (2013.01)

(58) Field of Classification Search
None
See application file for complete search history.

(56) References Cited

U.S. PATENT DOCUMENTS

| | | | |
|---|---|---|---|
| 2005/0058059 A1 | 3/2005 | Amer | |
| 2007/0121740 A1* | 5/2007 | Gallagher | ..................... 375/260 |
| 2009/0285337 A1* | 11/2009 | Cheng et al. | ................... 375/343 |
| 2010/0086082 A1 | 4/2010 | Ogawa et al. | |

FOREIGN PATENT DOCUMENTS

| | | |
|---|---|---|
| CN | 101594691 A | 12/2009 |
| CN | 101656702 A | 2/2010 |
| CN | 101682448 A | 3/2010 |
| WO | 2011121044 A1 | 10/2011 |

OTHER PUBLICATIONS

Mansour, A. M., "Optimized Architecture for Computing Zadoff-Chu Sequences with Application to LTE," IEEE GLOBECOM 2009 proceedings, 6 pages.
Chinese Office Action dated Dec. 3, 2014, 15 pages.

* cited by examiner

*Primary Examiner* — Brandon Renner

(57) ABSTRACT

Method and apparatus for processing a signal using a recursive method for determining a plurality of frequency components of the signal, the signal being a chirp-like polyphase sequence, wherein a first frequency component of the plurality of frequency components is determined; a component factor is determined by accessing a factor table for use in determining a second frequency component of the plurality of frequency components; and the second frequency component is determined using the determined first frequency component and the determined component factor.

28 Claims, 2 Drawing Sheets

US 9,084,269 B2

FOURIER TRANSFORM FOR A SIGNAL TO BE TRANSMITTED ON A RANDOM ACCESS CHANNEL

CROSS-REFERENCE TO RELATED APPLICATION

This application is the National Stage of, and therefore claims the benefit of, International Application No. PCT/EP2011/054954 filed on Mar. 30, 2011, entitled "FOURIER TRANSFORM FOR A SIGNAL TO BE TRANSMITTED ON A RANDOM ACCESS CHANNEL," which was published in English under International Publication Number WO 2011/121044 on Oct. 6, 2011, and has a priority date of Mar. 30, 2010, based on GB application 1005319.7. Both of the above applications are commonly assigned with this National Stage application and are incorporated herein by reference in their entirety.

FIELD OF THE INVENTION

This invention relates to processing a signal to be transmitted on a random access channel, in particular where the signal is for use as a random access channel preamble.

BACKGROUND

In a wireless cellular communication system, the procedure of establishing communication between a mobile terminal or User Equipment (UE) and a base station is called random access. Such random access can be implemented using a random access channel (RACH) in, for example, an orthogonal frequency division multiplexing (OFDM) communication system or a single carrier frequency division multiplexing (SC-FDMA) communication system. Random access enables the establishment of the uplink from a UE to a base station. Using the RACH, a UE can send a notification to the network indicating that the UE has data to transmit. Receipt of the notification at the base station allows the base station to estimate the UE timing, to thereby realize uplink synchronization between the UE and the base station.

The random access channel (RACH) typically consists of a ranging signal or a preamble. The preamble is designed to allow the base station to detect the random access attempt within target detection and false alarm probabilities, and to minimise the impact of collisions on the RACH, as is known in the art. Moreover, the base station should be able to detect several simultaneous random preambles sent from different UEs and correctly estimate the timing of each of the UEs. In order to achieve that goal, the RACH preambles should have i) good cross-correlation properties to allow for accurate timing estimation of different simultaneous and asynchronous RACH preambles, ii) good auto-correlation properties to allow for accurate timing estimation, iii) zero cross-correlation for synchronous and simultaneous RACH preambles.

Long Term Evolution (LTE) wireless networks, also known as Evolved Universal Terrestrial Radio Access Networks (E-UTRAN), are being standardized by the 3GPP working groups. The Orthogonal Frequency Division Multiple Access (OFDMA) access scheme and the Single Carrier Frequency Division Multiple Access (SC-FDMA) access scheme were chosen for the downlink (DL) and the uplink (UL) of E-UTRAN, respectively. Signals from different User Equipments (UEs) to a base station are time and frequency multiplexed on a physical uplink shared channel (PUSCH). In the case that the UE is not UL synchronized, the UE uses a non-synchronized Physical Random Access Channel (PRACH) to communicate with the base station, and in response the base station provides UL resources and timing advance information to allow the UE to transmit on the PUSCH.

The 3GPP RAN Working Group 1 (WG1) has agreed on the preamble based physical structure of the PRACH (as described in "3GPP TS 36.211 Evolved Universal Terrestrial Radio Access (E-UTRA); Physical channels and modulation"). The RAN WG1 also agreed on the number of available preambles that can be used concurrently to minimize the collision probability between UEs accessing the PRACH in a contention-based manner. The Zadoff-Chu (ZC) sequence has been selected for RACH preambles for LTE networks.

A Zadoff-Chu sequence is a complex-valued mathematical sequence which, when used for radio signals, gives rise to a signal, whereby cyclically shifted versions of the signal do not cross-correlate with each other when the signal is recovered, for example at the base station. A generated Zadoff-Chu sequence that has not been shifted is known as a "root sequence". The Zadoff-Chu sequence exhibits the useful property that cyclically shifted versions of the sequence remain orthogonal to one another, provided that each cyclic shift, when viewed within the time domain of the signal, is greater than the combined propagation delay and multi-path delay-spread of the signal as it is transmitted between the UE and base station.

The complex value at each position (n) of each root ($\mu$) of the Zadoff-Chu sequence (for odd $N_{ZC}$, where $N_{ZC}$ is the length of the Zadoff-Chu sequence) is given by:

$$x_\mu(n) = e^{-j\frac{\pi\mu n(n+1)}{N_{ZC}}},$$

where $0 \leq n \leq N_{ZC} - 1$.

All of the RACH preambles are generated by cyclic shifts of a number of root sequences of the Zadoff-Chu sequence, which are configurable on a cell-basis. A RACH preamble is transmitted from a UE to the base station to allow the base station to estimate, and if needed, adjust the timing of the UE transmission. It has been agreed by the RAN WG1 that there are a total of 64 RACH preambles allocated for each cell of a base station. Specifically, a cell can use different cyclically shifted versions of the same ZC root sequence, or other ZC root sequences if needed, as RACH preambles. To maximize the number of available Zadoff-Chu sequences for a certain sequence length ($N_{ZC}$) it is preferred to choose the sequence length as a prime number, and therefore an odd number. Typically for LTE, the length of the Zadoff-Chu may be for example 839 or 139 depending on the format of the RACH preamble.

For the uplink in LTE wireless networks, SC-FDMA is used which is a single-carrier transmission based on Discrete Fourier Transform (DFT) spread OFDM. With reference to FIG. 1, the principle of SC-FDMA will now be described. FIG. 1 shows a user equipment 101 and a base station 121. The user equipment comprises a serial to parallel block 102 with a serial input for receiving a serial signal. The user equipment 101 further comprises an N-point Discrete Fourier Transform (DFT) block 104, a subcarrier mapping block 106, an M-point Inverse Discrete Fourier Transform (IDFT) block 108, a parallel to serial block 110, a Cyclic Prefixing (CP) and Pulse shaping (PS) block 112, a Digital to Analogue converter (DAC) and Radio Frequency (RF) converter block 114 and an antenna 116 for transmitting a signal over a channel 118 of the communication system. The serial to parallel block 102 has a parallel output coupled to a parallel input of the N-point DFT block 104. A parallel output of the N-point DFT block 104 is coupled to a parallel input of the subcarrier mapping block 106. A parallel output of the subcarrier mapping block 106 is coupled to a parallel input of the M-point IDFT block 108. A parallel output of the M-point IDFT block 108 is coupled to a parallel input of the parallel to serial block 110. A serial output of the parallel to serial block 110 is coupled to an input of the CP and PS block 112. An output of the CP and PS block 112 is coupled to an input of the DAC and RF converter block 114. An output of the DAC and RF converter block 114 is coupled to the antenna 116.

The base station 121 comprises an antenna 120 for receiving a signal over the channel 118 of the communication system. The base station further comprises a Radio Frequency (RF) converter and Analogue to Digital converter (ADC) block 122, a remove Cyclic Prefixing (CP) block 124, a serial to parallel block 126, an M-point Discrete Fourier Transform (DFT) block 128, a subcarrier demapping and equalization block 130, an N-point Inverse Discrete Fourier Transform (IDFT) block 132, a parallel to serial block 134 and a detection block 136 for detecting the signals.

A serial output of the antenna 120 is coupled to a serial input of the RF converter and ADC block 122. A serial output of the RF converter and ADC block 122 is coupled to a serial input of the remove CP block 124. A serial output of the remove CP block 124 is coupled to a serial input of the serial to parallel block 126. A parallel output of the serial to parallel block is coupled to a parallel input of the M-point DFT block 128. A parallel output of the M-point DFT block 128 is coupled to a parallel input of the subcarrier demapping and equalization block 130. A parallel output of the subcarrier demapping and equalization block 130 is coupled to a parallel input of the N-point IDFT block 132. A parallel output of the N-point IDFT block 132 is coupled to a parallel input of the parallel to serial block 134. A serial output of the parallel to serial block 134 is coupled to a serial input of the detection block 136.

In operation, for LTE uplink at the UE 101, a block of N modulation symbols are received at the serial to parallel block 102 and are applied as a parallel input to the N-point DFT block 104. The N-point DFT block 104 performs a discrete Fourier transform on the modulation symbols and then the output of the N-point DFT block 104 is applied to consecutive inputs of the M-point IFFT block 108 (where M>N) via the subcarrier mapping block 106. The output of the M-point IDFT block 108 is converted to a serial signal by the parallel to serial block 110 and a cyclic prefix is applied to each block of the serial signal in the CP and PS block 112. The signal is converted to an analogue signal and modulated at radio frequency in the DAC and RF converter block 114 before being transmitted using the antenna 116 over the channel 118 to the antenna 120 of the base station 121.

The signal received at the antenna 120 of the base station 121 is demodulated and converted to a digital signal in the RF converter and ADC block 122. The cyclic prefix is removed in the remove CP block 124. The signal is then converted to a parallel signal by the serial to parallel block 126 before the M-point DFT block 128 performs a discrete Fourier transform of the signal. The output of the M-point DFT block 128 is demapped and equalized by the subcarrier demapping and equalization block 130 before the N-point IDFT block 132 performs an inverse discrete Fourier transform on the signal. The output of the N-point IDFT block 132 is converted to a serial signal by parallel to serial block 134 before being passed to the detection block 136 for detection.

Since typically for a RACH preamble, a DFT of size N=839 or 139 needs to be taken (depending on the format of the preamble), the operation performed in the N-point DFT block 104 is demanding in terms of computational complexity and memory. One method for implementing a DFT where the size of the DFT is a prime number is the Bluestein algorithm (Leo I. Bluestein, "A linear filtering approach to the computation of the discrete Fourier transform," Northeast Electronics Research and Engineering Meeting Record 10, 218-219 (1968)). In the Bluestein algorithm the DFT is re-expressed as a convolution which provides a way to compute prime-size DFTs with a computational complexity of the order $O(N \log N)$.

It is an aim of the present invention to reduce the computational complexity required to perform a prime number DFT for use in processing a signal to be transmitted on a Random Access Channel.

SUMMARY

According to a first aspect of the invention there is provided a method of processing a signal to be transmitted on a random access channel, the signal being a chirp-like polyphase sequence, the method being a recursive method for determining a plurality of frequency components of the signal, comprising: determining a first frequency component of the plurality of frequency components; determining a component factor by accessing a factor table for use in determining a second frequency component of the plurality of frequency components; and determining the second frequency component using the determined first frequency component and the determined component factor.

According to a second aspect of the invention there is provided apparatus for processing a signal to be transmitted on a random access channel using a recursive method for determining a plurality of frequency components of the signal, the signal being a chirp-like polyphase sequence, the apparatus comprising: means for determining a first frequency component of the plurality of frequency components; means for determining a component factor by accessing a factor table for use in determining a second frequency component of the plurality of frequency components; and means for determining the second frequency component using the determined first frequency component and the determined component factor.

According to a third aspect of the invention there is provided a computer program product comprising computer readable instructions for execution on a computer, the instructions being for processing a signal to be transmitted on a random access channel, the signal being a chirp-like polyphase sequence, the instructions comprising instructions for executing a recursive method for determining a plurality of frequency components of the signal comprising the steps of: determining a first frequency component of the plurality of frequency components; determining a component factor by accessing a factor table for use in determining a second frequency component of the plurality of frequency components; and determining the second frequency component using the determined first frequency component and the determined component factor.

An efficient implementation of the DFT of a Zadoff-Chu sequence (or any other chirp-like polyphase sequence) is provided without needing to perform a Fourier transform. The method uses a recursive relation with reduced complexity. The Zadoff-Chu sequence has been chosen to be used for RACH preambles in LTE wireless networks, so the ability to implement a Fourier transform with reduced complexity on Zadoff-Chu sequences is particularly beneficial. However, it is noted that the method works with any signal that is a chirp-like polyphase sequence. The Zadoff Chu sequence is just one example of a chirp-like polyphase sequence. As would be apparent to a skilled person, chirp-like polyphase sequences have ideal periodic autocorrelation functions. Details on chirp-like polyphase sequences can be found in "Generalized Chirp-Like Polyphase Sequences with optimum Correlation Properties" by Branislav M. Popović, IEEE Transactions on Information Theory, vol. 38, No. 4, July 1992, pages 1406 to 1409. It is described in that reference that as well as Zadoff-Chu sequences, Frank sequences and also Ipatov sequences are chirp-like polyphase sequences.

The complexity of implementing the Fourier Transform is reduced by using a lookup table with a simple index computation. Such indexing requires less processing power than performing a conventional DFT. The table may be stored at the UE. Component factors in the table may be calculated by the UE. Alternatively, the component factors stored in the table may be calculated by an entity other than the UE and passed to the UE for storage thereon.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Figure 1:
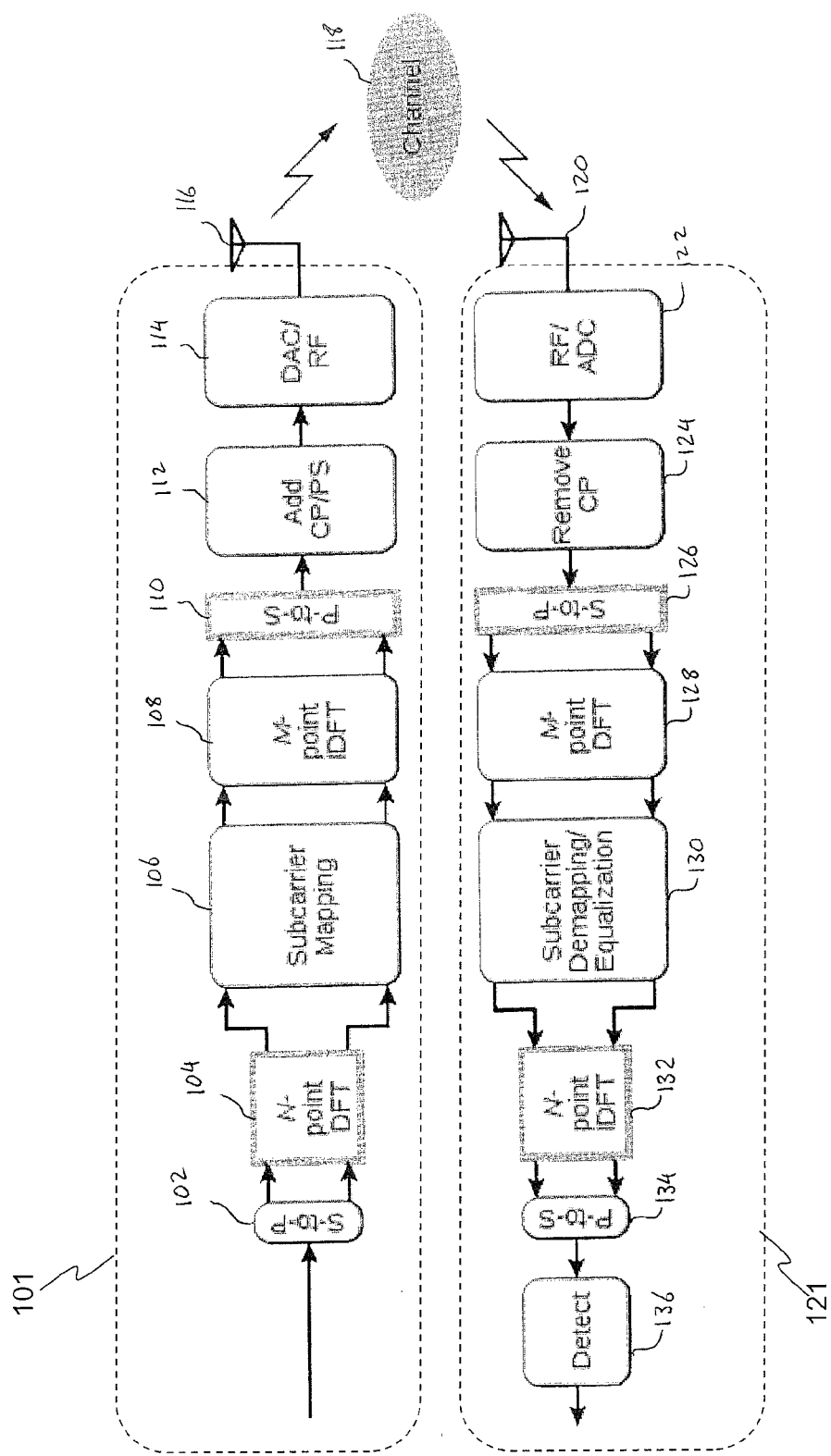
FIG. 1 is a schematic representation of a SC-FDMA communication system.

Before describing a preferred embodiment of the invention, there is provided a derivation of equations that are used in the preferred embodiment to facilitate the understanding of the invention.

As described above, the Zadoff-Chu sequence (for odd $N_{ZC}$) is defined by $$x(n) = e^{-j\frac{\pi\mu n(n+1)}{N_{ZC}}}$$

$$x(n) = e^{\left(-\frac{2j\pi\mu \sum_{i=1}^{n} i}{N_{ZC}}\right)}$$

$$x(n) = \prod_{i=1}^{n} e^{\left(-\frac{2j\mu i}{N_{ZC}}\right)}$$

where the fact that $$\sum_{i=1}^{n} i = \frac{n(n+1)}{2}$$

has been used.

This can be rewritten as a recursive equation, such that:

$$x(n) = x(n-1)e^{-\frac{2j\pi\mu n}{N_{ZC}}}.$$

Taking the Discrete Fourier transform of the above relation and using the DFT properties, one gets:

$$X(k) = X(k+\mu)e^{-\frac{2j\pi(\mu+k)}{N_{ZC}}}, \qquad (1)$$

where $X(k)$ is the discrete Fourier transform of $x(n)$.

Based on equation (1), recursively one can write using the shift properties of the DFT:

$$\begin{aligned}X(k) &= X(k+\mu)e^{\left(-\frac{2j\pi(\mu+k)}{N_{zc}}\right)} \\ &= X(k+2\mu)e^{\left(-\frac{2j\pi(\mu+k)}{N_{zc}}\right)}e^{\left(-\frac{2j\pi(2\mu+k)}{N_{zc}}\right)} \\ &\vdots \\ &= X(k+m\mu)\prod_{l=1}^{m} e^{\left(-\frac{2j\mu(l\mu+k)}{N_{zc}}\right)} \\ &= X(k+m\mu)e^{\left(-\frac{2j\pi\sum_{l=1}^{m}(k+l\mu)}{N_{zc}}\right)} \\ &= X(k+m\mu)e^{-\frac{2j\pi mk}{N_{zc}}}e^{-j\pi\mu\frac{m(m+1)}{N_{zc}}}\end{aligned}$$

Let us introduce the following notation. Two integers a and b are said to be congruent modulo n, if their difference a−b is an integer multiple of n. An equivalent definition is that both numbers have the same remainder when divided by n. If this is the case, it is expressed as:

$$a = b \bmod n.$$

Let us choose m such that $m\mu=1 \bmod N_{ZC}$. m always exists since $N_{ZC}$ and $\mu$ are relatively prime numbers (i.e. they share no common positive factors, or divisors, except 1) by construction of the Zadoff-Chu sequence. Then, from the periodicity property of the DFT:

$$X(k+m\mu) = X(k+1),$$

one obtains the final result as:

$$X(k+1) = X(k)e^{\frac{2j\pi mk}{N_{ZC}}}e^{j\pi\mu\frac{m(m+1)}{N_{ZC}}} \qquad (2)$$

with $$X(0) = \sum_{n=0}^{N_{ZC}-1} e^{-j\pi\mu\frac{n(n+1)}{N_{ZC}}}.$$

From equation (2), one can get an expression for $X(k)$ as:

$$X(k) = X(k-1)e^{\frac{2j\pi m(k-1)}{N_{ZC}}}e^{j\pi\mu\frac{m(m+1)}{N_{ZC}}}$$

By recursion one gets:

$$X(k) = X(k-2)e^{\frac{2j\pi m(k-2)}{N_{ZC}}}e^{j\pi\mu\frac{m(m+1)}{N_{ZC}}}e^{j\pi\mu\frac{m(m+1)}{N_{ZC}}}e^{j\pi\mu\frac{m(m+1)}{N_{ZC}}}$$

which leads to:

$$X(k) = X(0)\prod_{l=0}^{k-1} e^{\frac{2j\pi ml}{N_{ZC}}} e^{j\pi\mu\frac{m(m+1)}{N_{ZC}}}$$

and finally to the result that:

$$X(k) = X(0)e^{\frac{2j\pi mk(k-1)}{N_{ZC}}} e^{j\pi\mu\frac{km(m+1)}{N_{ZC}}} \quad (3)$$

In the case where $N_{ZC}$ is even, the Zadoff-Chu sequence is given by:

$$x(n) = e^{-j\pi\mu\frac{n^2}{N_{ZC}}}.$$

One can show by inductive proof that:

$$x(n) = x(n-1)e^{\left(-\frac{2j\pi\mu n}{N_{ZC}}\right)} e^{\left(-\frac{j\pi\mu}{N_{ZC}}\right)}.$$

Similarly to the derivations above, one obtains:

$$X(k) = X(k+\mu)e^{-\frac{2j\pi(\mu+k)}{N_{ZC}}} e^{-\frac{j\pi\mu}{N_{ZC}}} \quad (4)$$

which leads to:

$$X(k) = X(k+m\mu)\prod_{l=1}^{m} e^{-\frac{2j\pi(l\mu+k)}{N_{ZC}}} e^{-\frac{j\pi\mu}{N_{ZC}}}$$

$$X(k) = X(k+m\mu)e^{-\frac{2j\pi mk}{N_{ZC}}} e^{-j\pi\mu\frac{m(m+1)}{N_{ZC}}} e^{-\frac{j\pi m\mu}{N_{ZC}}}$$

If m is such that $m\mu=1 \bmod N_{ZC}$ exists, then one can rewrite the above equation as:

$$X(k) = X(k+1)e^{-\frac{2j\pi mk}{N_{ZC}}} e^{-j\pi\mu\frac{m(m+1)}{N_{ZC}}} e^{-\frac{j\pi m\mu}{N_{ZC}}} \quad (5)$$

$X(k)$ can be expressed as (if m is such that $m\mu=1 \bmod N_{ZC}$ exists):

$$X(k) = X(0)\prod_{l=0}^{k-1} \left( e^{-\frac{2j\pi ml}{N_{ZC}}} e^{j\pi\mu\frac{m(m+1)}{N_{ZC}}} e^{\frac{j\pi m\mu}{N_{ZC}}} \right)$$

$$X(k) = X(0)e^{-\frac{j\pi mk(k-1)}{N_{ZC}}} e^{j\pi\mu\frac{km(m+1)}{N_{ZC}}} e^{\frac{j\pi km\mu}{N_{ZC}}}$$

If m is such that $m\mu=1 \bmod N_{ZC}$ does not exist, one can find the smallest integer $\beta$ such that $\min\{\beta|\beta<\mu$ and $m\mu=\beta \bmod N_{ZC}\}$ in order to minimize the delay, and Equation (3) becomes:

$$X(k) = X(k+\beta)e^{-\frac{2j\pi mk}{N_{ZC}}} e^{-j\pi\mu\frac{m(m+1)}{N_{ZC}}} e^{-\frac{j\pi\mu m}{N_{ZC}}} \quad (6)$$

From the μth root of the Zadoff-Chu sequence, random access preambles with zero correlation zones of length $N_{CS}-1$ are defined by cyclic shifts according to:

$$x_{\mu,v} = x_\mu((n+C_v) \bmod N_{ZC})$$

$$x_\mu = e^{-j\pi\mu\frac{n(n+1)}{N_{ZC}}}$$

for $0 \leq n \leq N_{ZC}$, where $$C_v = \begin{cases} vN_{CS} & v=0,1,\ldots,\lfloor N_{ZC}/N_{CS}\rfloor-1, N_{CS} \neq 0 \text{ for unrestricted sets} \\ 0 & N_{CS}=0 \text{ for unrestricted sets} \\ d_{start}\lfloor v/n_{shift}^{RA}\rfloor+(v \bmod n_{shift}^{RA})N_{CS} & v=0,1,\ldots,n_{shift}^{RA}n_{group}^{RA}+n_{shift}^{-RA}-1 \text{ for restricted sets} \end{cases}$$

and $N_{CS}$ is signalled by high layers.

The DFT for a Zadoff-Chu sequence of odd length is given by Equation (2) above:

$$x_\mu(k+1) = X_\mu(k)e^{\frac{2j\pi mk}{N_{ZC}}} e^{j\pi\mu\frac{m(m+1)}{N_{ZC}}}$$

The DFT of the vth cyclically shifted Zadoff-Chu sequence is given by:

$$x_{\mu,v}(k) = X_\mu(k)e^{\frac{2j\pi C_v k}{N_{ZC}}}.$$

Therefore by modifying the recursive equation (2) shown above, one obtains:

$$X_{\mu,v}(k+1) = X_{\mu,v}(k)e^{\frac{2j\pi mk}{N_{ZC}}} e^{j\pi\mu\frac{m(m+1)}{N_{ZC}}} e^{\frac{2j\pi C_v k}{N_{ZC}}} \quad (7)$$

The exponential part of equation 7 for different values of k may be stored in a table at the user equipment, for use as component factors in determining the frequency components of the signal, as described below. Obtaining the exponential part of equation 7 (i.e. a component factor) can then be easily implemented by indexing into the table of component factors which for ease of notation is restricted to a size of $N_{ZC}$, which corresponds to $2\pi$ with a resolution of $2\pi/N_{ZC}$. In alternative embodiments, a table of different resolution and length may be used.

In this way the exponential part of equation (7) (referred to herein as the component factor) for different frequency components (k) is calculated and stored in the table. Each frequency component of the signal (X(k+1)) can be calculated using the previously calculated frequency component and a component factor obtained from the table. In other words X(k+1)=X(k)F$_{k+1}$, where F$_{k+1}$ is the component factor for the frequency component X(k+1) and is given by $$F_{k+1} = e^{\frac{2j\pi mk}{N_{ZC}}} e^{j\pi\mu \frac{m(m+1)}{N_{ZC}}} e^{\frac{2j\pi C_v}{N_{ZC}}},$$

and the values of F$_{k+1}$ can be determined by accessing the table in an indexed manner. The value of the exponent (divided by a factor of $$\frac{2\pi j}{N_{ZC}})$$

is used as the index for accessing the table, as described in more detail below. The values of F$_k$ for the different frequency components (k) in the signal may be calculated at the user equipment 101 and stored in the table. Alternatively, the values of F$_k$ for the different frequency components (k) in the signal may be calculated at an entity other than the user equipment 101 and stored in the table. The values of F$_k$ for the different frequency components (k) in the signal may be calculated before they are needed and stored in the table before they are needed. In this way, when the factors F$_k$ are needed they just need to be looked up from the table rather than calculated. The table is stored in memory of the user equipment.

Figure 2:
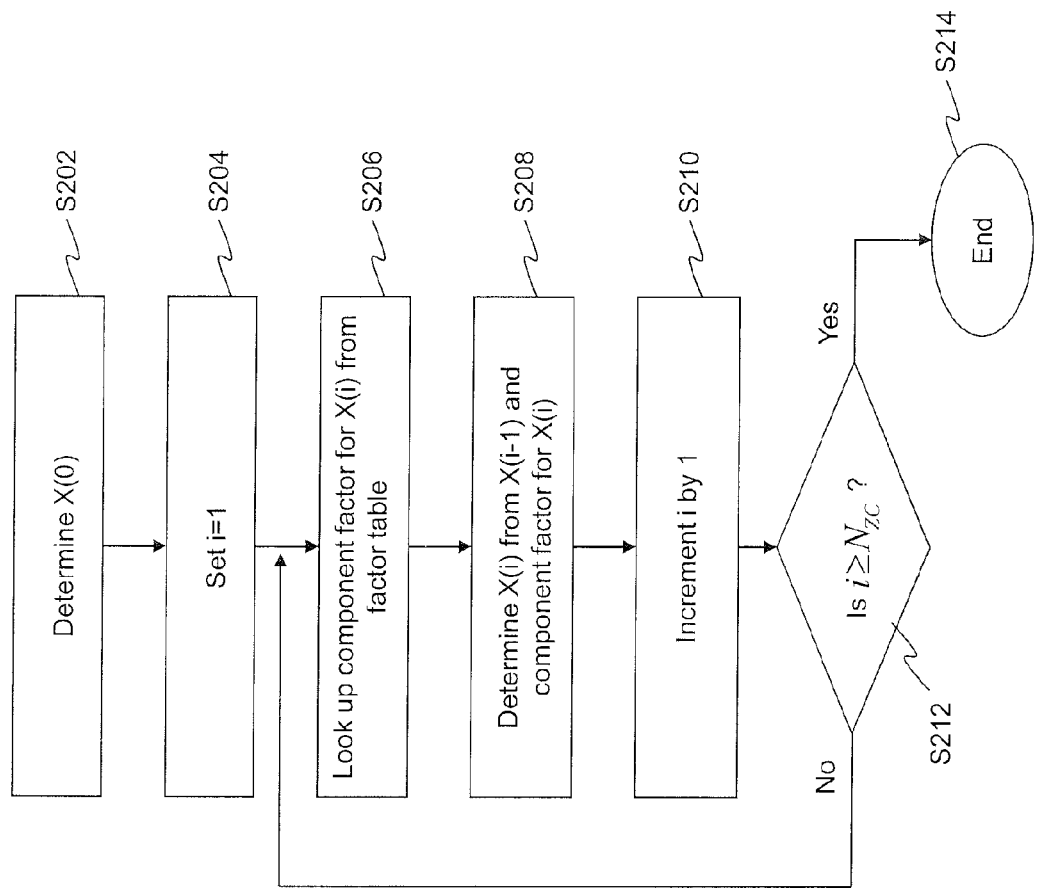
FIG. 2 is a flow chart for a process of processing a signal according to a preferred embodiment.

A method of carrying out the invention according to a preferred embodiment is now described with reference to the flow chart of FIG. 2. The method is carried out to implement a DFT, for use in a method of processing signals for transmission on a RACH, e.g. where the signals are RACH preambles. For example, the method may be implemented in the N-point DFT block 104 as shown in the system of FIG. 1.

In step S202 the frequency component X(0) is determined. X(0) may be determined by loading the frequency component from a store. Alternatively, X(0) may be calculated from the signal. Once the frequency component X(0) of the signal has been determined, the other frequency components in the signal can be calculated in a recursive manner using equation (7) above.

In order to begin the recursive method, in step S204, a counter i is set to 1 initially. Then in step S206 the component factor F$_i$ for the ith frequency component of the signal is looked up by indexing the table. Therefore on the first run through of the recursive method the component factor F$_1$ is obtained from the table. In step S208 the ith frequency component (X(i)) is determined using the previously determined frequency component (X(i−1)) and the component factor for the ith frequency component obtained in step S206. In the first run through of the recursive method the frequency component X(1) is determined by multiplying X(0) with F$_1$. In this sense, the component factors F$_i$ stored in the table are multiplying factors. Alternatively, the component factors F$_i$ stored in the table may be used to obtain the ith frequency component in other ways than by multiplication with a previously determined frequency component. The component factors obtained from the table may be used in conjunction with a previously determined frequency component in any way, as would be apparent to the skilled person, leading to a determination of the ith frequency component of the signal.

In the embodiments described above the component factors F$_k$ are stored in the table. This is a much simpler operation than calculating the DFT for each component factor.

In step S210 the counter i is incremented by 1 and in step S212 it is determined whether the counter i is greater than or equal to the length of the Zadoff-Chu sequence N$_{ZC}$. If the counter is greater than or equal to N$_{ZC}$ then all of the frequency components of the signal have been determined and the process ends in step S214. However, if the counter i is less than N$_{ZC}$ then the method passes back to step S206 and the next frequency component of the signal is determined. The process continues until all of the frequency components of the signal have been determined.

In this way, a running table index is obtained which is initialised to $$\frac{\mu m(m+1)}{2} + C_v = I \bmod N_{ZC} \text{ for } k = 0.$$

Using this index when accessing the table will return the value of the component factor F$_1$, given by $$F_1 = e^{\frac{2j\pi}{N_{ZC}}(\frac{\mu m(m+1)}{2} + C_v)}$$

(see the equation above for F$_{k+1}$). This component factor is then multiplied with X(0) to give X(1). The next pass in the recursion requires I to be updated by m as:

$$m = \gamma \bmod N_{ZC}$$

$$I_i + \gamma = I_{i+1} \bmod N_{ZC}$$

where I$_i$ is the index at iteration i. Note that the modulo operation does not need a divide since (I+γ) can never exceed 2N$_{ZC}$.

Pseudo code which may be used to implement the above described method will now be described. The pseudo code may be implemented in a computer program product for execution on a computer or other suitable hardware for carrying out the method as described above. Alternatively, the method may be carried out in hardware, rather than in software, as would be apparent to a skilled person.

In the following the notation a=b mod n is equivalent to b=mod(a,n).

The pseudo code may be written as follows:

```
load X(0) from a pre computed table or compute X(0)
Compute γ = mod(m,Nzc)
initialise I to mod(μm(m+1)/2 +Cv,Nzc)
for I=1 to Nzc−1
    e = load exp from table with index I
    X(i)=X(i−1)*e
    I=I+γ
    If I>=Nzc I=I−Nzc
endfor
```

It will be apparent to a person skilled in the art that using the method described above, as provided for by the pseudo code above, the frequency components X(i) can be determined in a recursive manner, thus requiring less computing power and complexity than performing a conventional Fourier transform to determine the frequency components X(i).

In an alternative embodiment, the computational complexity may be reduced even further. If the signal may be multiplied by a complex constant we can ensure that the frequency component X(0)=1. In this way the first frequency component is set to 1 so it does not need to be computed. Multiplying the signal by a complex constant is equivalent to a scaling introduced in the communication channel 118, which changes neither the received timing nor RACH detection probability nor false alarm probability as determined by the base station 121. Therefore multiplying the signal by a complex constant does not detrimentally affect the use of the signal as a RACH preamble.

Where the signal is multiplied by a complex constant to ensure that the frequency component X(0) is equal to 1, the multiplication of the component factor obtained from the factor table and the previously determined frequency component in the recursive method described above may be avoided altogether. In this case the algorithm may be modified to have the following pseudo code.

```
Set X(0) = 1
Compute γ= mod(m,Nzc)
Initialise I to mod(μm(m+1)/2 +Cv,Nzc)
J=0
for i=1 to Nzc-1
    J=J+I
    If J>=Nzc, J=J-Nzc
    e = load exp from table with index J
    X(i)=e
    I=I+γ
    If I>=Nzc I=I-Nzc
endfor
```

In this alternative embodiment, it can be seen from equation (7) that with X(0) equal to 1, all of the frequency components will equal $e^{d_i}$ where $d_i$ is different for each of the frequency components X(i). Since $e^a e^b = e^{a+b}$, each frequency component can be computed by adding up the indices for all previous frequency components and using the sum of the indices as the index for accessing the table. The pseudo code given above for this alternative embodiment implements this by loading the component factors using the index J where J is the sum of all previously determined indices I.

As would be apparent to the skilled person, a similar implementation approach could be used for the case where $N_{ZC}$ is even based on Equations 5 and 6.

There have been described above methods of implementing a Fourier transform for use in the signal processing of RACH preambles using the Zadoff-Chu sequence. The methods described above do not use a dedicated Fourier transform algorithm for calculating the frequency components of the signal. This results in reduced complexity and reduced memory requirements. The implementation of the DFT is simplified by using a table-lookup with index computation.

While the specific description is directed towards signal processing of signals using the Zadoff-Chu sequence, it would be apparent to a skilled person that the method could also be applied to any other chirp-like polyphase sequence.

While this invention has been particularly shown and described with reference to preferred embodiments, it will be understood to those skilled in the art that various changes in form and detail may be made without departing from the scope of the invention as defined by the appendant claims.

The invention claimed is:

1. A method of processing a signal, wherein the signal is a Zadoff-Chu sequence in which the signal, x, at each position, n, of each root, μ, of the Zadoff-Chu sequence is given by $$x_\mu(n) = e^{-j\pi\mu\frac{n(n+1)}{N_{ZC}}},$$

where $N_{ZC}$ is the length of the Zadoff-Chu sequence, the method being a recursive method for determining a plurality of frequency components of the signal, comprising:
    determining a first frequency component of the plurality of frequency components;
    determining a component factor by accessing a factor table for use in determining a second frequency component of the plurality of frequency components;
    determining the second frequency component using the determined first frequency component and the determined component factor;
    setting an increment variable, γ; and
    setting an index variable I,
    wherein said step of determining a component factor comprises loading the component factor from the factor table using the index variable I, the method further comprising:
    incrementing the index variable I by the increment variable γ for determining a subsequent component factor by loading the subsequent component factor from the factor table using the incremented index variable.

2. The method of claim 1 wherein there is at least one further frequency component of the signal and the method further comprises for each of the further frequency components:
    determining a respective further component factor by accessing the factor table for use in determining the further frequency component; and
    determining the further frequency component using a previously determined frequency component and the determined further component factor.

3. The method of claim 2 wherein the previously determined frequency component is the frequency component determined most recently prior to determining each respective further frequency component.

4. The method of claim 2 wherein the previously determined frequency component is the first frequency component.

5. The method of claim 1 further comprising setting the first frequency component to 1 so it does not need to be computed.

6. The method of claim 1 wherein the factor table stores a plurality of component factors in an indexed manner for use in determining the plurality of frequency components of the signal, and wherein the step of obtaining the component factor comprises indexing the factor table with an index corresponding to the component factor.

7. The method of claim 6 further comprising calculating the plurality of component factors and storing the calculated component factors in the factor table.

8. The method of claim 1 wherein the step of determining the first frequency component comprises loading the first frequency component from a store.

9. The method of claim 1 wherein the step of determining the first frequency component comprises calculating the first frequency component from the signal.

10. The method of claim 1 wherein the component factor is a multiplication factor, and wherein the step of determining the second frequency component comprises multiplying the first frequency component by the component factor.

11. The method of claim 1 wherein the length of the Zadoff-Chu sequence is a prime number.

12. The method of claim 11 wherein the length of the Zadoff-Chu sequence is 139 or 839.

13. The method of claim 1 wherein the (k+1)th frequency component, X(k+1), of the signal is determined using the kth frequency component, X(k), of the signal and the (k+1)th component factor, $F_{k+1}$, according to the formula:

$$X(k+1)=X(k)F_{k+1},$$

where $$F_{k+1} = e^{\frac{2j\pi mk}{N_{ZC}}} e^{j\pi\mu \frac{m(m+1)}{N_{ZC}}} e^{\frac{2j\pi C_v}{N_{ZC}}},$$

and where m is an integer chosen such that $m\mu=1 \bmod N_{ZC}$, and $C_v$ is an integer defined by the equation $x_{\mu,v}=x_\mu((n+C_v) \bmod N_{ZC})$ where for the µth root of the Zadoff-Chu sequence, $x_{\mu,v}$ is a cyclically shifted version of $x_\mu$ wherein $x_{\mu,v}$ and $x_\mu$ have zero correlation zones of length $N_{CS}-1$.

14. The method of claim 1 further comprising:
setting the first frequency component to 1 so it does not need to be computed:
setting an increment variable, γ;
setting an index variable I;
setting a loading variable J such that J=I initially,
wherein said step of determining a component factor comprises loading the component factor from the factor table using the loading variable J, and said step of determining the second frequency component comprises setting the second frequency component to be the determined component factor, the method further comprising:
incrementing the index variable I by the increment variable γ; and
incrementing the loading variable J by the index variable I for determining a subsequent component factor by loading the subsequent component factor from the factor table using the incremented loading variable.

15. The method of claim 1 wherein the increment variable γ is set such that $\gamma=\bmod(m, N_{ZC})$, where m is an integer chosen such that $m\mu=1 \bmod N_{ZC}$, and the index variable I is set such that $$I = \bmod\left(\mu m \frac{(m+1)}{2} + C_v, N_{ZC}\right).$$

16. The method of claim 1 further comprising applying the determined frequency components to consecutive inputs of an Inverse Fast Fourier Transform block.

17. The method of claim 1 further comprising:
separating the signal into blocks for transmission; and
inserting a cyclic prefix into each block.

18. The method of claim 1 further comprising transmitting the signal on the random access channel.

19. The method of claim 1 wherein the signal is a random access channel preamble.

20. The method of claim 1 wherein the signal is transmitted in the uplink on the random access channel.

21. Apparatus for processing a signal to be transmitted on a random access channel using a recursive method for determining a plurality of frequency components of the signal, the signal being a Zadoff-Chu sequence in which the signal, x, at each position, n, of each root, µ, of the Zadoff-Chu sequence is given by $$x_\mu(n) = e^{-j\pi\mu\frac{n(n+1)}{N_{ZC}}},$$

where $N_{ZC}$ is the length of the Zadoff-Chu sequence, the apparatus comprising a processor configured to:
determine a first frequency component of the plurality of frequency components;
determine a component factor by accessing a factor table for use in determining a second frequency component of the plurality of frequency components; and
determine the second frequency component using the determined first frequency component and the determined component factor, wherein the (k+1)th frequency component, X(k+1), of the signal is determined using the kth frequency component, X(k), of the signal and the (k+1)th component factor, $F_{k+1}$, according to the formula:

$$X(k+1)=X(k)F_{k+1},$$

where $$F_{k+1} = e^{\frac{2j\pi mk}{N_{ZC}}} e^{j\pi\mu \frac{m(m+1)}{N_{ZC}}} e^{\frac{2j\pi C_v}{N_{ZC}}},$$

and where m is an integer chosen such that $m\mu=1 \bmod N_{ZC}$, and $C_v$ is an integer defined by the equation $x_{\mu,v}=x_\mu((n+C_v) \bmod N_{ZC})$ where for the µth root of the Zadoff-Chu sequence, $x_{\mu,v}$ is a cyclically shifted version of $x_\mu$ wherein $x_{\mu,v}$ and $x_\mu$ have zero correlation zones of length $N_{CS}-1$.

22. The apparatus of claim 21 wherein said processor is further configured to:
set an increment variable, γ; and
set an index variable I,
wherein said processor is configure to determine said component factor by loading the component factor from the factor table using the index variable I, the processor further configured to:
increment the index variable I by the increment variable γ for determining a subsequent component factor by loading the subsequent component factor from the factor table using the incremented index variable.

23. The apparatus of claim 21 further comprising a memory for storing the factor table.

24. The apparatus of claim 21, the processor further configured to apply the determined frequency components of the signal to consecutive inputs of the Inverse Fast Fourier Transform block.

25. The apparatus of claim 21 wherein the processor is further
configured to separate the signal into blocks for transmission and
insert a cyclic prefix into each block.

26. The apparatus of claim 21 further comprising a transmitter for transmitting the signal.

27. A computer program product comprising computer readable instructions stored on a non-transitory computer readable medium for execution on a computer, the instructions being for processing a signal to be transmitted on a random access channel, the signal being a Zadoff-Chu sequence in which the signal, x, at each position, n, of each root, µ, of the Zadoff-Chu sequence is given by $$x_\mu(n) = e^{-j\pi\mu \frac{n(n+1)}{N_{ZC}}},$$

where $N_{ZC}$ is the length of the Zadoff-Chu sequence, the instructions comprising instructions for executing a recursive method for determining a plurality of frequency components of the signal comprising the steps of:
- determining a first frequency component of the plurality of frequency components;
- determining a component factor by accessing a factor table for use in determining a second frequency component of the plurality of frequency components;
- determining the second frequency component using the determined first frequency component and the determined component factor;
- setting the first frequency component to 1 so it does not need to be computed:
- setting an increment variable, γ;
- setting an index variable I;
- setting a loading variable J such that J=I initially,
- wherein said step of determining a component factor comprises loading the component factor from the factor table using the loading variable J, and said step of determining the second frequency component comprises setting the second frequency component to be the determined component factor, the method further comprising:
- incrementing the index variable I by the increment variable γ; and
- incrementing the loading variable J by the index variable I for determining a subsequent component factor by loading the subsequent component factor from the factor table using the incremented loading variable.

28. The computer program product of claim 27 wherein the (k+1)th frequency component, X(k+1), of the signal is determined using the kth frequency component, X(k), of the signal and the (k+1)th component factor, $F_{k+1}$, according to the formula:

$$X(k+1) = X(k) F_{k+1},$$

where $$F_{k+1} = e^{\frac{2j\pi mk}{N_{ZC}}} e^{j\pi\mu \frac{m(m+1)}{N_{ZC}}} e^{\frac{2j\pi C_\nu}{N_{ZC}}},$$

and where m is an integer chosen such that mμ=1 mod $N_{ZC}$, and $C_\nu$ is an integer defined by the equation $x_{\mu,\nu} = x_\mu((n+C_\nu) \bmod N_{ZC})$ where for the μth root of the Zadoff-Chu sequence, $x_{\mu,\nu}$ is a cyclically shifted version of $x_\mu$ wherein $x_{\mu,\nu}$ and $x_\mu$ have zero correlation zones of length $N_{CS}-1$.

* * * * *